(12) United States Patent
Bouckaert et al.

(10) Patent No.: US 9,247,031 B2
(45) Date of Patent: Jan. 26, 2016

(54) TRANSACTION PROXY IN A TELECOMMUNICATIONS OR MESSAGING SYSTEM AND RELATED METHODS

(75) Inventors: Philippe Bouckaert, Grenoble (FR); Sridar Gopalaswamy, Grenoble (FR); David Clouaire, Sophia-Antipolis (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 2036 days.

(21) Appl. No.: 11/795,144

(22) PCT Filed: Jan. 19, 2006

(86) PCT No.: PCT/EP2006/050311
§ 371 (c)(1),
(2), (4) Date: Nov. 5, 2007

(87) PCT Pub. No.: WO2006/077235
PCT Pub. Date: Jul. 27, 2006

(65) Prior Publication Data
US 2008/0051119 A1 Feb. 28, 2008

(30) Foreign Application Priority Data
Jan. 21, 2005 (EP) .................................. 05300050

(51) Int. Cl.
*H04W 4/00* (2009.01)
*H04L 29/06* (2006.01)
*H04M 3/533* (2006.01)
*H04W 4/14* (2009.01)
(Continued)

(52) U.S. Cl.
CPC ............ *H04L 69/16* (2013.01); *H04L 67/2814* (2013.01); *H04L 69/169* (2013.01); *H04M 3/533* (2013.01); *H04W 4/12* (2013.01); *H04W 4/14* (2013.01)

(58) Field of Classification Search
CPC .......... H04M 1/72552; H04M 3/4228; H04M 2207/20; H04M 1/7255; H04L 51/04; H04L 12/581; H04L 12/5895; H04L 12/585; H04L 12/1895; H04L 51/26; H04L 51/36; H04L 63/101; H04W 4/02; H04W 4/12; H04W 4/06; H04W 4/08; H04W 4/008; H04W 4/14; H04W 12/04; H04W 12/08; H04W 4/00; H04W 60/00; H04W 12/02; H04W 92/02

USPC ........ 455/414.1, 466, 412.1, 412.2, 566, 418, 455/411, 419; 709/203, 206, 207, 220, 223, 709/240, 221, 227, 232; 370/352, 259, 338, 370/546; 379/88.14, 88.17, 88.22
See application file for complete search history.

(56) References Cited

U.S. PATENT DOCUMENTS

2004/0043777 A1* 3/2004 Brouwer et al. ............... 455/466
2004/0052247 A1* 3/2004 Stahl et al. .................... 370/352
(Continued)

FOREIGN PATENT DOCUMENTS

EP 1 397 013 3/2004
GB 2 401 754 11/2004

OTHER PUBLICATIONS

1 Loughney et al., "Signalling Connection Control Part User Adaptation Layer (SUA)," IETF Standard-Working-Draft, Internet Engineering Task Force, vol. Sigtran, No. 16, Dec. 11, 2003, 118 Sheets.
(Continued)

*Primary Examiner* — Fred Casca
(74) *Attorney, Agent, or Firm* — Hewlett Packard Enterprise Patent Department

(57) ABSTRACT

Methods and related apparatus are described of operating a transaction proxy to act as a conduit for a structured transaction, such as Transaction Capabilities Application Part (TCAP) structured dialog between a first transaction peer, for instance an Short Message Service Center (SMSC), and a second transaction peer, for instance an Mobile Switching Center (MSC). The method comprises the steps of: receiving a begin message; determining an address of the first transaction peer from the begin message; responding to the begin message by sending a continue message to the first transaction peer; and, if no abort message is received from the first transaction peer, forwarding the begin message to the second transaction peer. Embodiments of the invention employ the techniques for filtering mobile terminating forward Short Message (mt-forwardSM) messages containing spoofed addresses in Global System for Mobile Communications (GSM) systems.

15 Claims, 2 Drawing Sheets

(51) Int. Cl.
*H04W 4/12* (2009.01)
*H04L 29/08* (2006.01)

(56) References Cited

U.S. PATENT DOCUMENTS

2005/0078660 A1* 4/2005 Wood ............................ 370/352

2007/0281718 A1* 12/2007 Nooren ......................... 455/466

OTHER PUBLICATIONS

Siemens, "SMS Fraud Countermeasure," 3GPP TSG SA WG3 Security, Jul. 6, 2004, 4 Sheets.

* cited by examiner

TRANSACTION PROXY IN A TELECOMMUNICATIONS OR MESSAGING SYSTEM AND RELATED METHODS

BACKGROUND OF THE INVENTION

1. Field of the Invention

The invention relates to a transaction proxy, for instance, in a telecommunications and or messaging system, and methods of operating such a transaction proxy.

2. Background Art

Electronic messaging using the short message service (SMS) that is available in GSM networks is being used increasingly to send mobile phone users unsolicited messages known as "spam". This can become an annoyance to users who often blame the operator. In several countries, SMS spam is already a major subject of customer complaints.

One fraud scenario that has been identified, for instance in a document referenced S3-040581 and made public by the 3GPP, consists in a party sending many MAP forward Short-Messages (mt-forwardSM) with the source SMSC address spoofed. The recipient MSC acknowledges the message delivery to the SMSC, and in addition charging information is produced which among other relevant information, captures the SMSC address from which the short message was received. The consequence is a misalignment of the accounting mechanism between the originating network and terminating network. The termination network will request more money from the originating network than justified, resulting in inaccurate interoperator accounting as well as annoyance for the recipients of the messages.

SUMMARY OF THE INVENTION

This invention is directed to the provision and use of a transaction proxy in order to mitigate the above-described problem, for instance.

To this end, the invention provides a method of operating a transaction proxy to act as a conduit for a structured transaction between a first transaction peer and a second transaction peer, the structured transaction having potentially at least a begin message for opening a logical communication path, a continue message for maintaining a logical communication path, and an abort message for causing the transaction to be cancelled. The method comprises the steps of: receiving a begin message; determining an address of the first transaction peer from the begin message; responding to the begin message by sending a continue message to the first transaction peer; and, if no abort message is received from the first transaction peer, forwarding the begin message to the second transaction peer. The method can comprise setting a timer and forwarding the begin message to the second transaction peer after a predeterminable time period has elapsed and the first continue message can contain an application context reflecting an application context supported by the second transaction peer.

If the source address in the first begin message is spoofed, then the element at that spoofed address will have no context for the transaction when it receives the first continue message and will thus automatically generate an abort message. The transaction proxy reacts to this abort message by cancelling the transaction, so that the second transaction peer never receives the first BEGIN message. If the address is not spoofed, then after the timeout period the transaction proceeds normally between the first and second transaction peers.

In preferred embodiments, the gateway is a signalling gateway linking an SS7 network and an IP network and the structured transaction is a TCAP structured dialogue although it will be understood that application of the technique to similar or comparable environments is not excluded. The second transaction peer could be an MSC, for instance, and the first transaction peer a bona fide or rogue SMSC or any other source of spoofed messages.

Other aspects of the invention provide a transaction proxy, a signalling gateway a telecommunications system and a messaging system comprising such a transaction proxy and a method of filtering spoofed messages.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENTS

Figure 1:
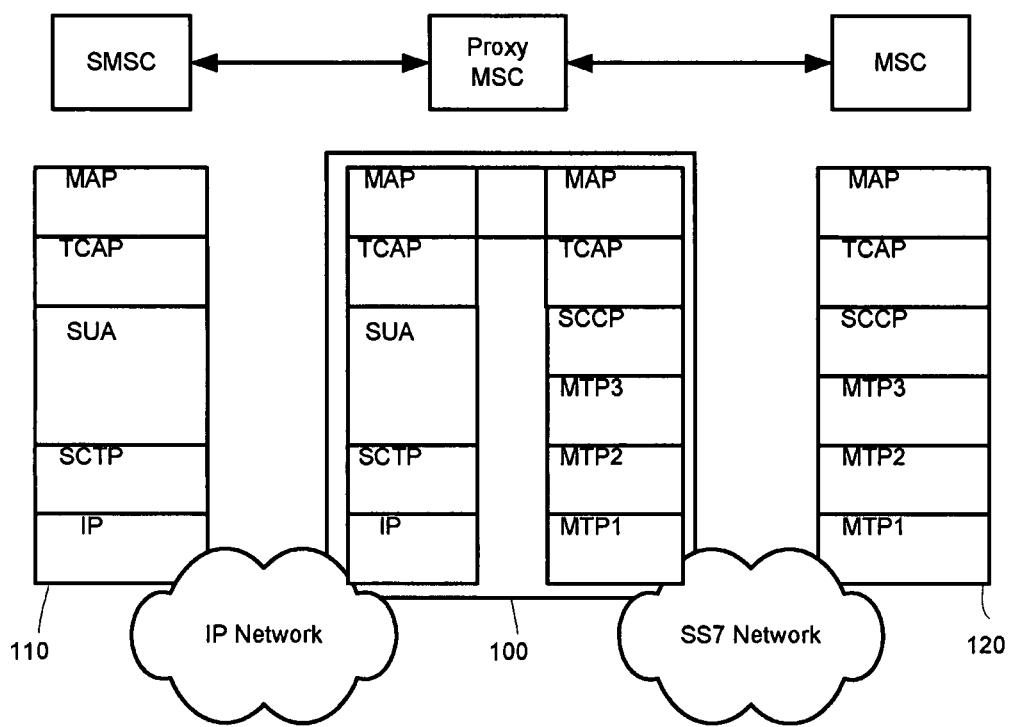
FIG. 1 illustrates the layered protocol communications schemes of a SMSC, a transaction proxy and an MSC in one embodiment of the invention.

FIG. 1 illustrates the layered software architecture of a system including a proxy element, proxy Mobile Switching Center (PMSC) 100, interconnecting a first transaction peer, in this example Short Message Service Center (SMSC) 110, and a second transaction peer, in this example (MSC) 120. In the example shown, MSC 120 is assumed, for the purposes of example only, to be located within an SS7 network and includes the MTP1, MTP2, MTP3, SCCP and SCCP user part (in the example shown, TCAP and MAP) layers. SMSC 110 is assumed, for the purposes of example only, to be located within an IP network and includes IP, SCTP, SUA and SCCP user layers (TCAP and MAP). Thus in this example the proxy element, Proxy MSC 100, could conveniently form part of a SIGTRAN signalling gateway linking the SS7 network and the IP network. pMSC 100 is arranged to intercept all traffic destined to a transaction peer located behind it—in this case MSC 120.

As is well known, the MAP (Mobile Application Part) is a standard protocol that lies above TCAP and that is used between mobile switches and databases to support user authentication, equipment identification, and roaming.

One feature of the TCAP protocol is that TCAP exchanges support the notion of a structured dialogue. The structured dialogue facilities provide the capability for TCAP users to act as transaction peers, to explicitly initiate a dialogue, exchange components within the dialogue, terminate it, or abort it. In order to better understand the operation of the present embodiment, the following is a brief summary of the relevant aspects of the operation of a TCAP structured dialogue.

The TCAP dialogue handling service interface enables the TCAP-user (such as the MAP layers within SMSC 110, Proxy MSC 100 and MSC 120), to make use of additional services provided by the transfer and negotiation of application context and the transparent transfer of other user information.

In a structured dialogue, a first TCAP-user, acting as a first transaction peer, begins a new dialogue by sending a TC-BEGIN request primitive to a second TCAP-user, acting as a second transaction peer. The purpose of this primitive is to indicate to the TCAP Component Sub-layer that a new dialogue has started, identified by the "dialogue ID" parameter of the primitive and to request transmission of any component(s) previously passed to the TCAP Component Sub-layer by means of component handling primitives of the "request" type with the same dialogue ID.

A TCAP-user that begins a new dialogue may also indicate, as an option, the application context name applicable to it. The application context name is used to enable the TCAP users to inform each other of their capabilities (ie what versions and protocol types they support).

If the Application Context Name parameter has been included in the TC-BEGIN request primitive, a Dialogue Request (AARQ) APDU is also sent by the first TCAP user, concatenated with the Component Portion.

The second TCAP-user indicates that it wants to continue a dialogue by issuing a TC-CONTINUE request primitive. This establishes the dialogue proposed in the received TC-BEGIN indication primitive. The dialog may be also terminated directly by the second TCAP user sending a TC-END message to the first TCAP user. In the both cases, TC-CONTINUE or TC-END, a Dialog Response (AARE) APDU is included in the message to acknowledge the AARQ received.

The techniques described here allow a transaction proxy, such as a suitably configured SIGTRAN Signalling Gateway, to validate a calling party address before forwarding an operation to the intended transaction peer and thereby provide a technique for filtering spoofed messages, that is messages having spoofed calling addresses.

Referring back to the example shown in FIG. 1, pMSC 100 is arranged to intercept all traffic destined for a transaction peer located behind it, and to perform the handshake operation to be described below which serves to validate the calling party address received. pMSC 100 is then able to determine if this address is spoofed or not. This solution is independent of the network protocol used between the proxy and the transaction peers. For instance, this protocol may equally be legacy SS7—MTP, SCCP—, or a Sigtran protocol, such as M3UA or SUA.

Figure 2A:
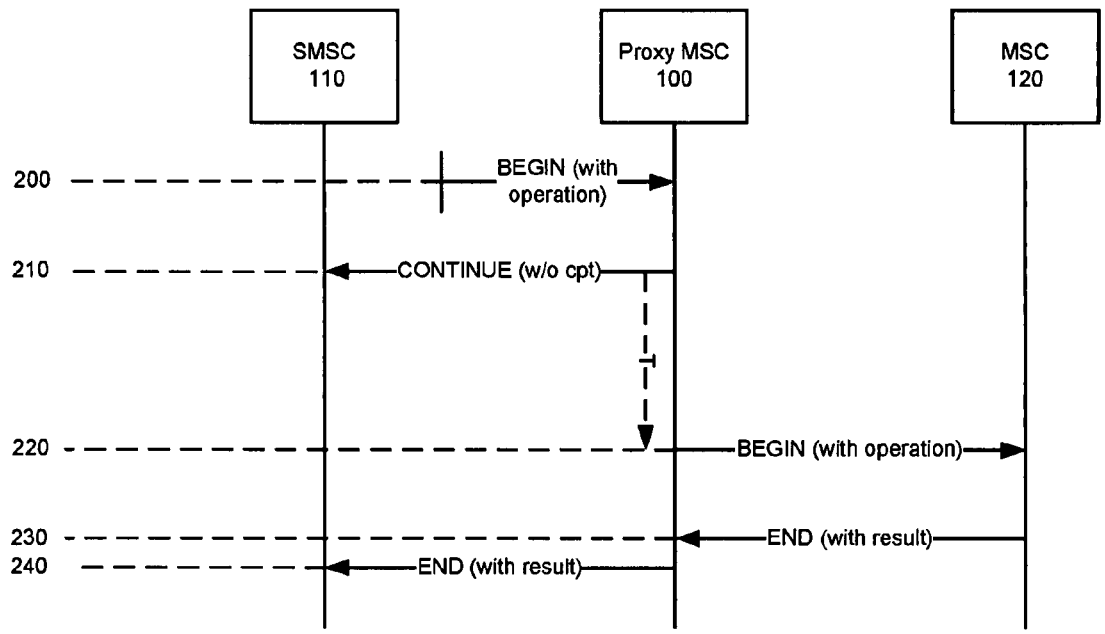
FIGS. 2A and 2B are flow diagrams illustrating a TCAP transaction carried out via a transaction proxy.
Figure 2B:
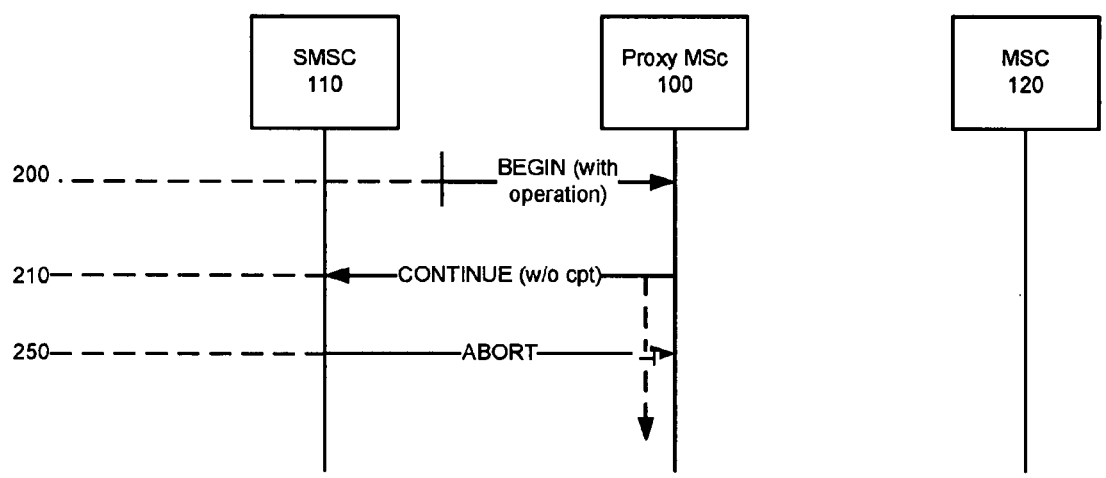

The process is illustrated in FIGS. 2A and 2B. FIG. 2A illustrates the situation when an address is bona fide, ie not spoofed.

In step 200, pMSC 100 receives a TC-BEGIN operation with the calling address of SMSC 110 (which may be spoofed). A MAP operation, such as mt-forwardSM, is assumed to be contained in the TC-BEGIN message. As described above, a common fraud scenario consists in a party sending many such mt-forwardSM operations, via TCAP, with the source SMSC address spoofed. pMSC 100 processes the message and determines the MSC 120 to which the message has to be sent. The pMSC is assumed to be pre-configured with the TCAP application contexts supported by MSC 120, in order to be able to acknowledge this application context in place of the MSC in step 210.

According to that information, and the Application context contained in the TC-BEGIN message, a TC-CONTINUE message is sent back to SMSC 110 in step 210 to acknowledge the dialogue, but without any component inside. At the same time, a timer, with a suitably determined expiry time, is started, with the TC-BEGIN message as an associated context and a dialog context maintained.

On reception of such a TC-CONTINUE message, the MAP layer in SMSC 110 will check the application context, if present, but as there is no component inside the TC-CONTINUE message, no message will be sent back the pMSC 100.

Thus after a certain time has elapsed without receiving any response, pMSC 100 can have some level of certainty that the calling address in the TC-BEGIN message is not spoofed, since SMSC 110 is acting normally. The TC-BEGIN message can then be sent to MSC 120 in step 220 and the dialog context deleted.

In step 230, MSC 120 will answer by using an TC-END message, containing an application context. Finally, in step 240, pMSC 100 removes this application context, as this information has been already sent and forwards the TC-END message to SMSC 110.

FIG. 2B illustrates the situation where a calling address in spoofed Steps 200 and 210 are carried as described above in relation to FIG. 2A.

However when receiving the TC-CONTINUE message in step 210, the TCAP layer of SMSC 100, whose address has been spoofed, will not recognize the destination transaction ID of this message. According to the TCAP protocol, SMSC 110 will then send an TC-ABORT message, with Unrecognized Transaction_ID as Abort cause, back to pMSC 100—step 250.

When receiving this TC-ABORT message, pMSC 100 will simply stop the timer, and delete the context associated with the transaction. A log can also be created, if desired, for accounting purposes, for instance. The original TC-BEGIN message is not forwarded to MSC 120.

It will be understood that there is no need for pMSC 100 to maintain a dialog context other than during the timer period. The only modification that is made to the messages is to remove the application context from the TC-END messages received from MSC 120 before passing them to SMSC 110. Any other messages are relayed directly to/from MSC 120 from/to SMSC 110.

Whilst the above approach is consider particularly suitable for handling mt-forwardSM messages containing spoofed addresses, it will be understood that the approach can be used to validate any operation carried by TCAP. By the same token, application of the technique to any other similar or comparable situation is not excluded.

The invention claimed is:

1. A method of operating a transaction proxy device to act as a conduit for a structured transaction between a first transaction peer and a second transaction peer, the structured transaction having potentially at least a begin message for opening a logical communication path, a continue message for maintaining a logical communication path, and an abort message for causing the transaction to be cancelled, the method comprising the steps of:

receiving a begin message by the transaction proxy device from the first transaction peer, wherein the first transaction peer is a Short Message Service Center (SMSC), and wherein the transaction proxy device is a separate entity from the first transaction peer and the second transaction peer, wherein the second transaction peer is a Mobile Switching Center (MCS);

determining an address of the first transaction peer from the begin message by the transaction proxy device;

determining by the transaction proxy device whether the address of the first transaction peer has been spoofed by:
  sending a continue message to the address of the first transaction peer by the transaction proxy device;
  in response to receiving an abort message from the first transaction peer, concluding that the address has been spoofed;
  in response to not receiving the abort message from the first transaction peer, concluding that the address has not been spoofed;

in response to the transaction proxy device having concluded that the address has not been spoofed, forwarding the begin message to the second transaction peer by the transaction proxy device; and in response to the transaction proxy device having concluded that the address has been spoofed, not forwarding the beginning message to the second transaction peer by the transaction proxy device.

2. A method as claimed in claim 1 comprising setting a timer and forwarding the begin message to the second transaction peer after a predeterminable time period has elapsed.

3. A method as claimed in claim 1 wherein the continue message contains an application context reflecting an application context supported by the second transaction peer.

4. A method as claimed in claim 1 wherein the transaction proxy device is a signaling gateway.

5. A method as claimed in claim 4 wherein the signaling gateway links a Signaling System 7 (SS7) network and an IP network.

6. A method as claimed in claim 1 wherein the structured transaction is a Transaction Capabilities Application Part (TCAP) structured dialogue.

7. A method as claimed in claim 1 wherein the begin message contains a mobile terminating forward Short Message (mt-forwardSM) operation.

8. A transaction proxy device for acting as a conduit for a structured transaction between a first transaction peer and a second transaction peer, the second transaction peer being a Mobile Switching Center (MSC), the structured transaction having potentially at least a begin message for opening a logical communication path, a continue message for maintaining a logical communication path, and an abort message for causing the transaction to be cancelled, the transaction proxy device comprising:
program code elements for:
receiving a begin message by the transaction proxy device from the first transaction peer, wherein the first transaction peer is a Short Message Service Center (SMSC), and wherein the transaction proxy device is a separate entity from the first transaction peer and the second transaction peer;
determining an address of the first transaction peer from the begin message;
determining whether the address of the first transaction peer has been spoofed by:
sending a continue message to the address of the first transaction peer;
in response to receiving an abort message from the first transaction peer, concluding that the address has been spoofed;
in response to not receiving the abort message from the first transaction peer, concluding that the address has not been spoofed;
in response to the address having not been spoofed, forwarding the begin message to the second transaction peer; and
in response to the address having been spoofed, not forwarding the beginning message to the second transaction peer.

9. A transaction proxy device as claimed in claim 8 wherein the structured transaction is a Transaction Capabilities Application Part (TCAP) structured dialogue.

10. A signaling gateway comprising a transaction proxy device as claimed in claim 8.

11. A telecommunications system comprising a Signaling System 7 (SS7) network; an IP network and a signaling gateway as claimed in claim 10.

12. A messaging system comprising a transaction proxy device as claimed in claim 8 wherein the begin message contains mobile terminating forward Short Message (mt-forwardSM) operation.

13. A method of operating a transaction proxy device to act as a conduit for a Transaction Capabilities Application Part (TCAP) transaction between a Short Message Service Center (SMSC) and a Mobile Switching Center (MSC), the method comprising the steps of:
receiving a begin message containing mobile terminating forward Short Message (mt-forwardSM) operation by the transaction proxy device from the SMSC, wherein the transaction proxy device is a separate entity from the SMSC and the MSC;
determining an address of the SMSC from the begin message by the transaction proxy device;
determining by the transaction proxy device whether the address of the SMSC has been spoofed by:
sending a continue message to the address;
in response to receiving an abort message in response to the continue message, concluding that the address has been spoofed;
in response to not receiving an abort message in response to the continue message, concluding that the address has not been spoofed;
in response to the transaction proxy device having concluded that the address has not been spoofed, forwarding the begin message to the second transaction peer; and
in response to the transaction proxy device having concluded that the address has been spoofed, not forwarding the beginning message to the second transaction peer,
wherein the structured transaction is a TCAP structured dialogue; the second transaction peer is a Mobile Switching Center (MSC); and the begin message contains a mt-forwardSM operation.

14. A method as claimed in claim 13 wherein the transaction proxy device is a signaling gateway linking a Signaling System 7 (SS7) network and an IP network.

15. A method of filtering spoofed messages that are conveyed by a structured transaction between a first transaction peer and a second transaction peer, the structured transaction having potentially at least a begin message for opening a logical communication path, a continue message for maintaining a logical communication path, and an abort message for causing the transaction to be cancelled, the method comprising:
providing, by a device, a transaction proxy to act as a conduit for the structured transaction;
receiving a begin message by the transaction proxy provided by the device from the first transaction peer, wherein the first transaction peer is a Short Message Service Center (SMSC), and wherein the transaction proxy provided by the device is a separate entity from the first transaction peer and the second transaction peer;
determining by the transaction proxy provided by the device an address of the first transaction peer from the begin message;
determining by the transaction proxy provided by the device whether the address of the first transaction peer has been spoofed by:
sending a continue message to the address;
in response to receiving an abort message in response to the continue message, concluding that the address has been spoofed;
in response to not receiving an abort message in response to the continue message, concluding that the address has not been spoofed;

in response to the transaction proxy provided by the device having concluded that the address has not been spoofed, forwarding the begin message to the second transaction peer; and in response to the transaction proxy provided by the device having concluded that the address has been spoofed, not forwarding the beginning message to the second transaction peer, wherein the structured transaction is a Transaction Capabilities Application Part (TCAP) structured dialogue; the second transaction peer is a Mobile Switching Center (MSC); and the begin message contains a mobile terminating forward Short Message (mt-forwardSM) operation.

\* \* \* \* \*

UNITED STATES PATENT AND TRADEMARK OFFICE
CERTIFICATE OF CORRECTION

| | | |
|---|---|---|
| PATENT NO. | : 9,247,031 B2 | Page 1 of 1 |
| APPLICATION NO. | : 11/795144 | |
| DATED | : January 26, 2016 | |
| INVENTOR(S) | : Philippe Bouckaert et al. | |

It is certified that error appears in the above-identified patent and that said Letters Patent is hereby corrected as shown below:

In column 4, line 55, in Claim 1, delete "(MCS);" and insert -- (MSC); --, therefor.

Signed and Sealed this
Seventh Day of June, 2016

Michelle K. Lee
*Director of the United States Patent and Trademark Office*